Patented Jan. 2, 1923.

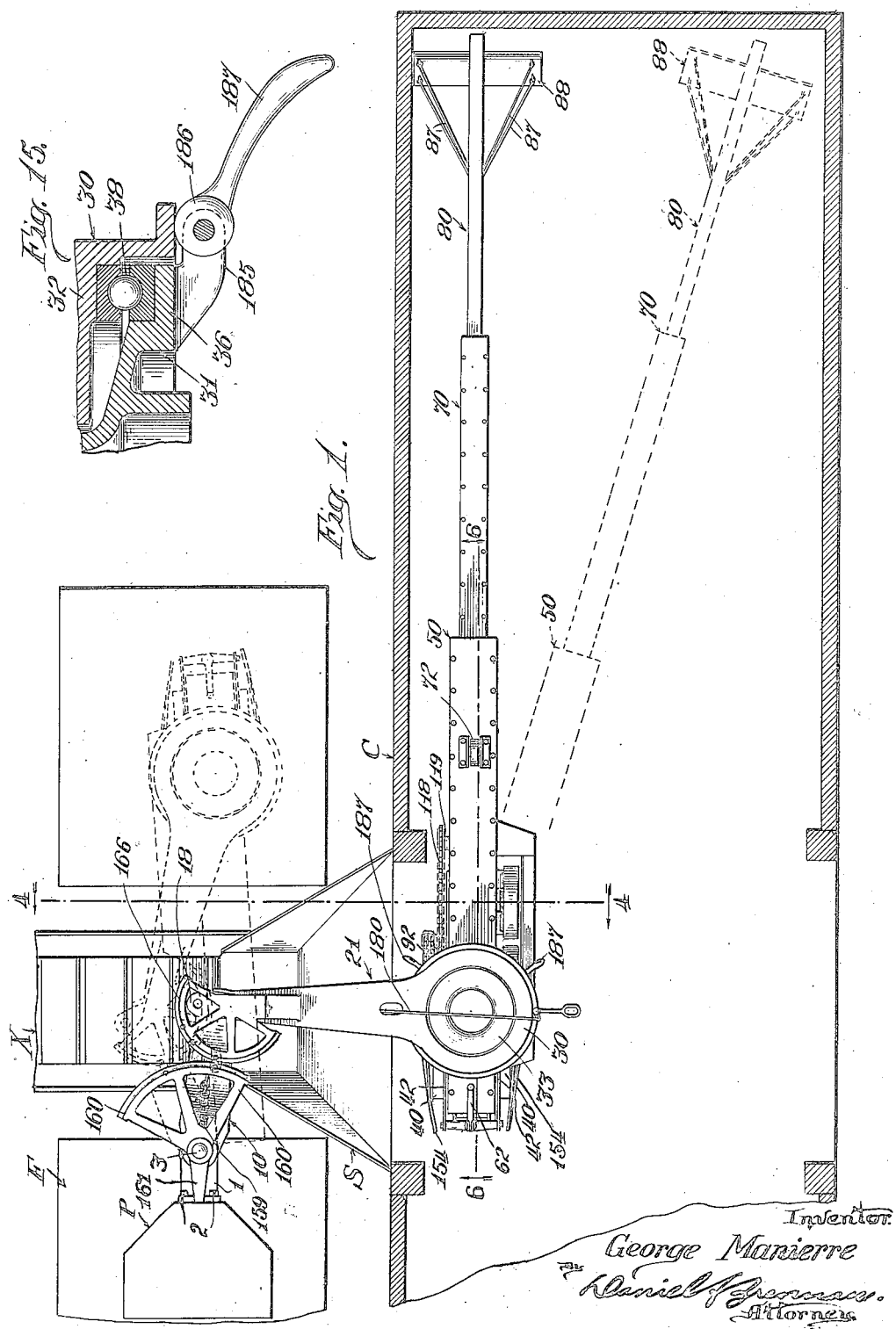

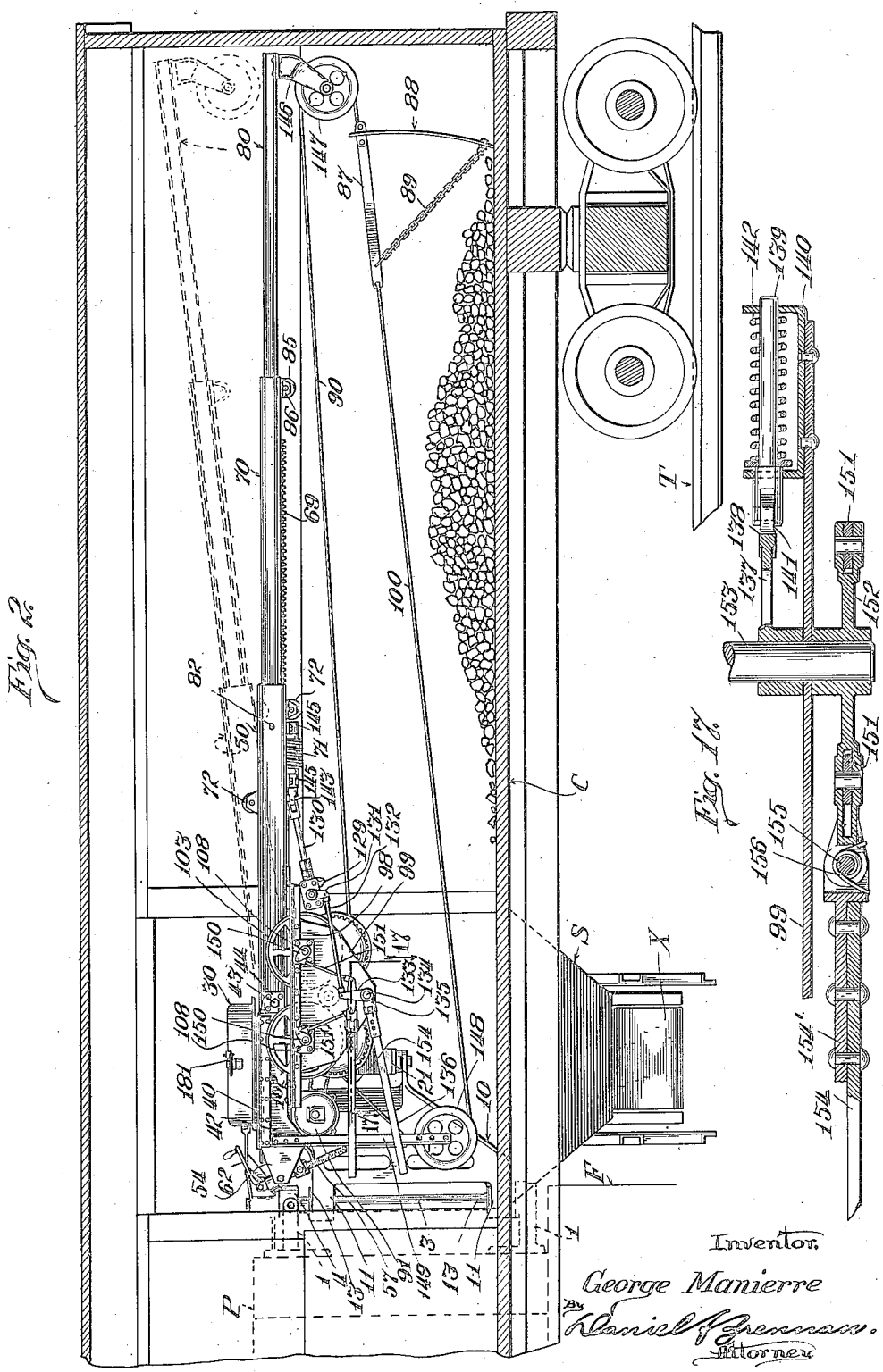

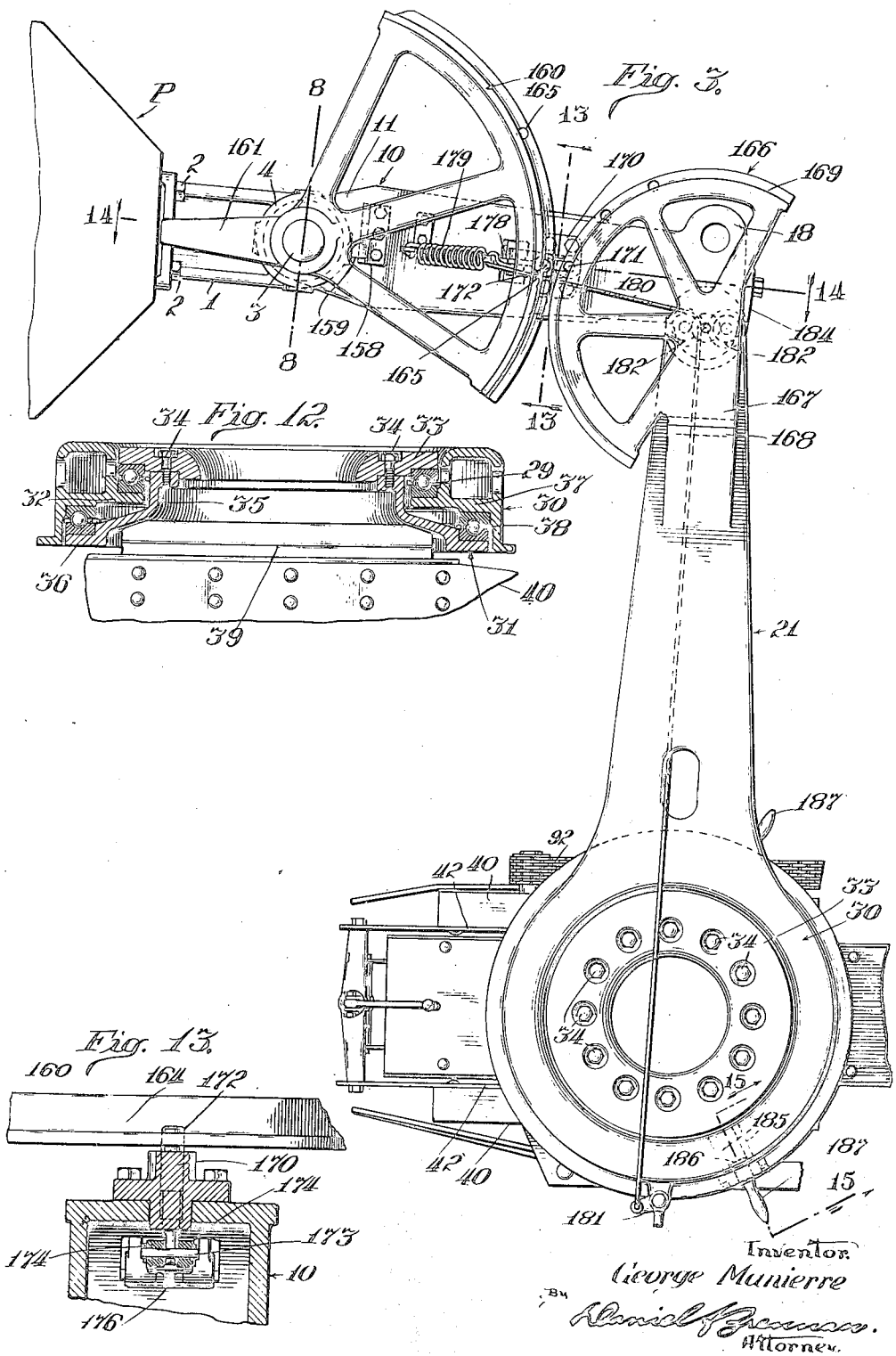

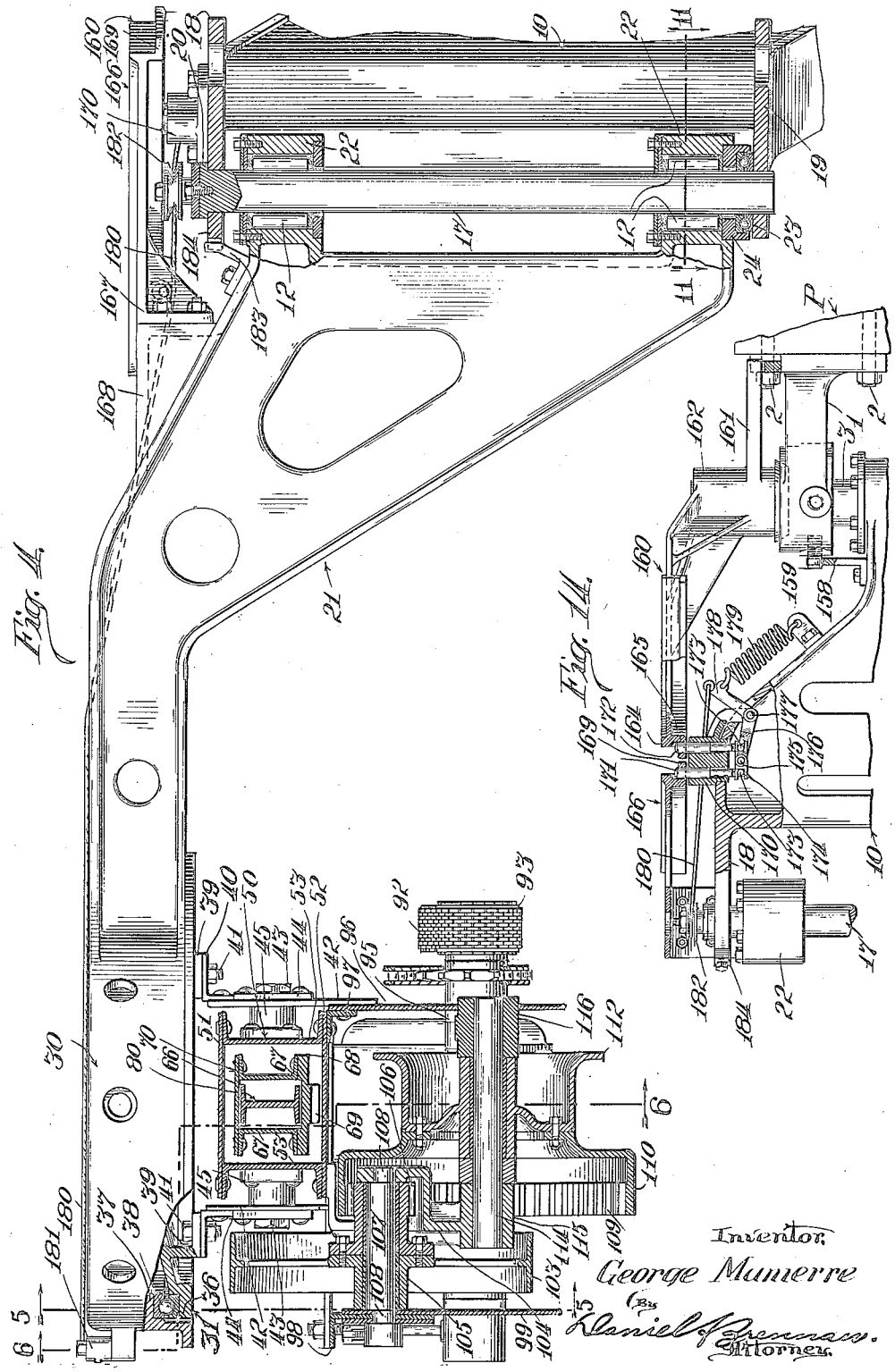

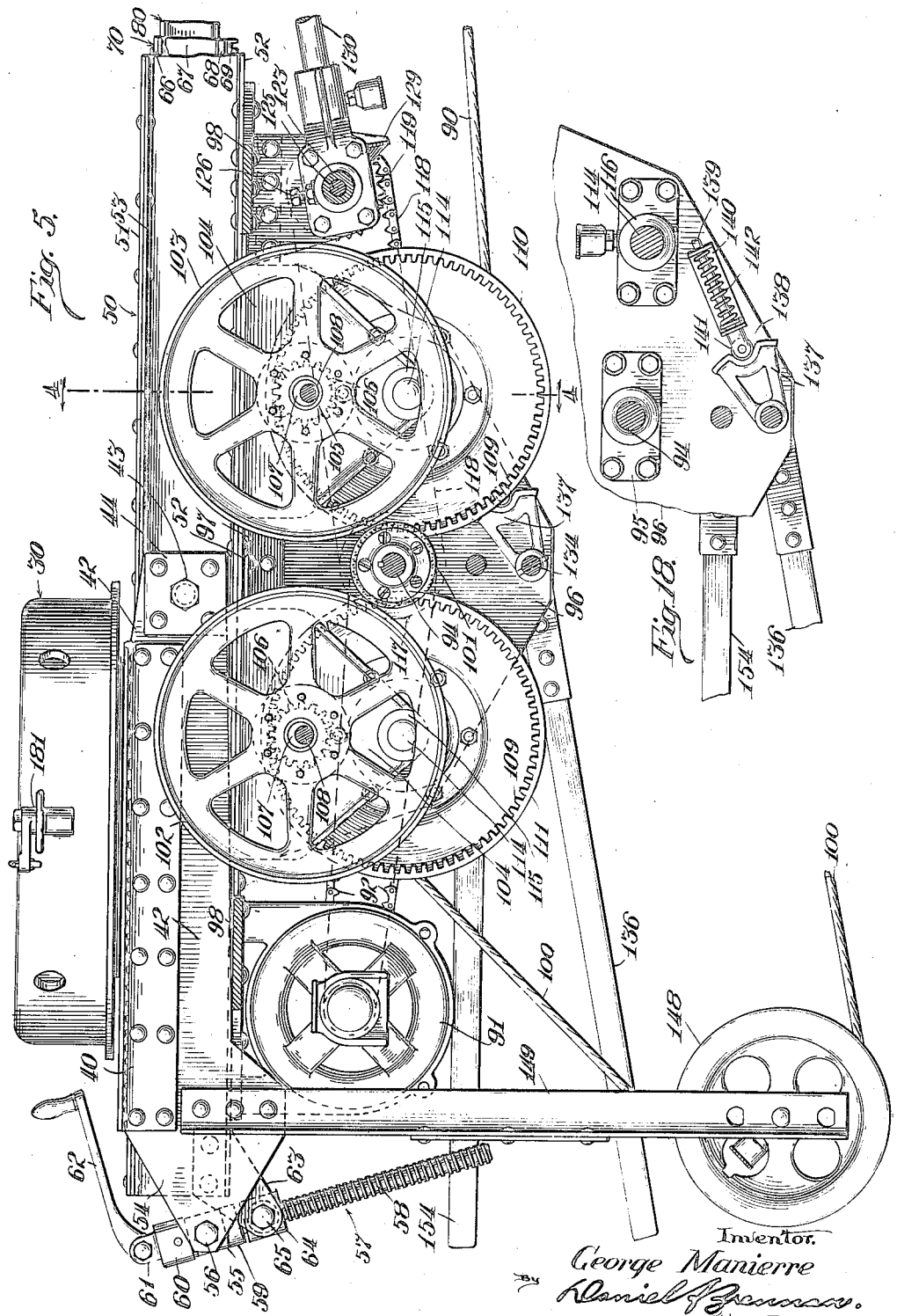

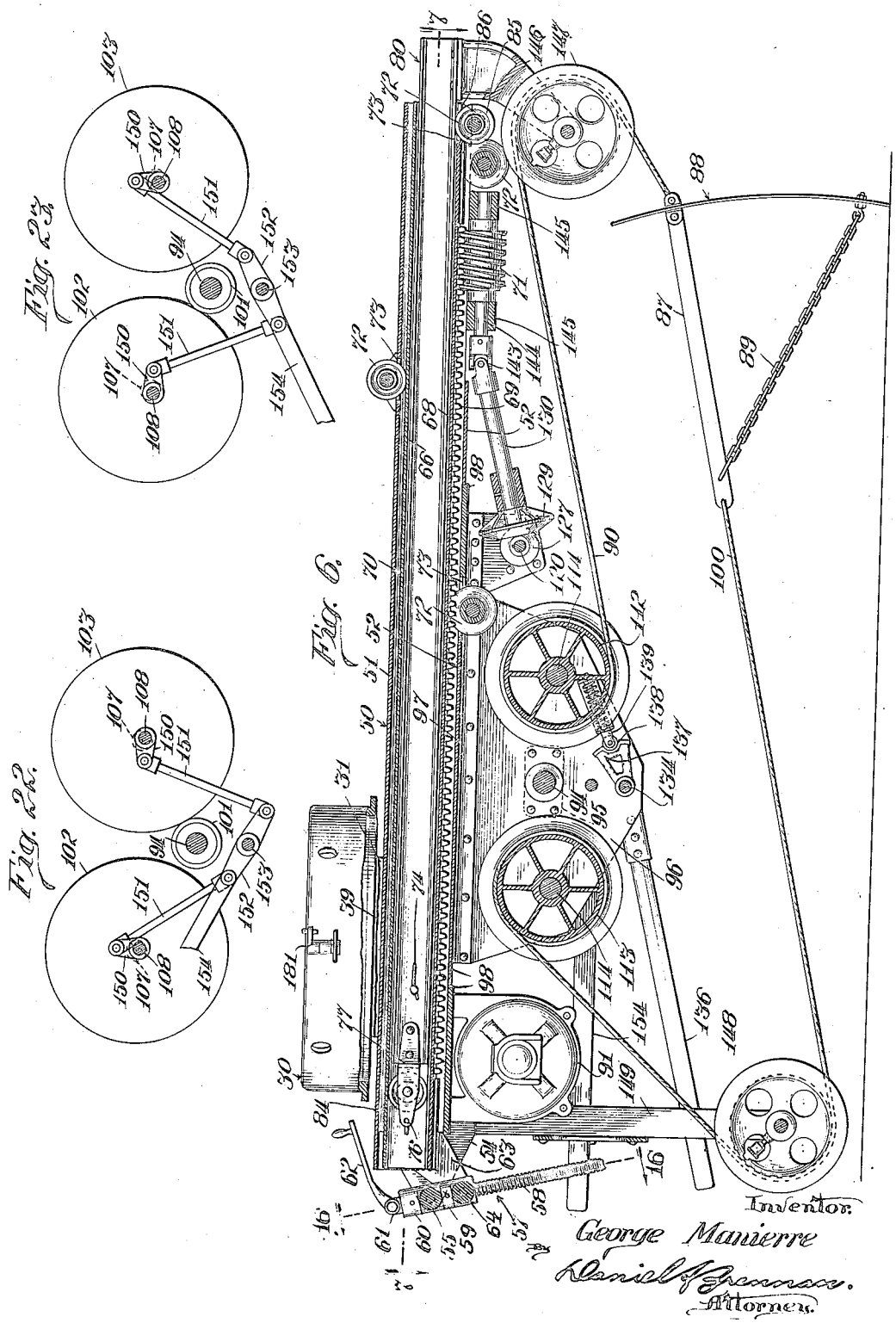

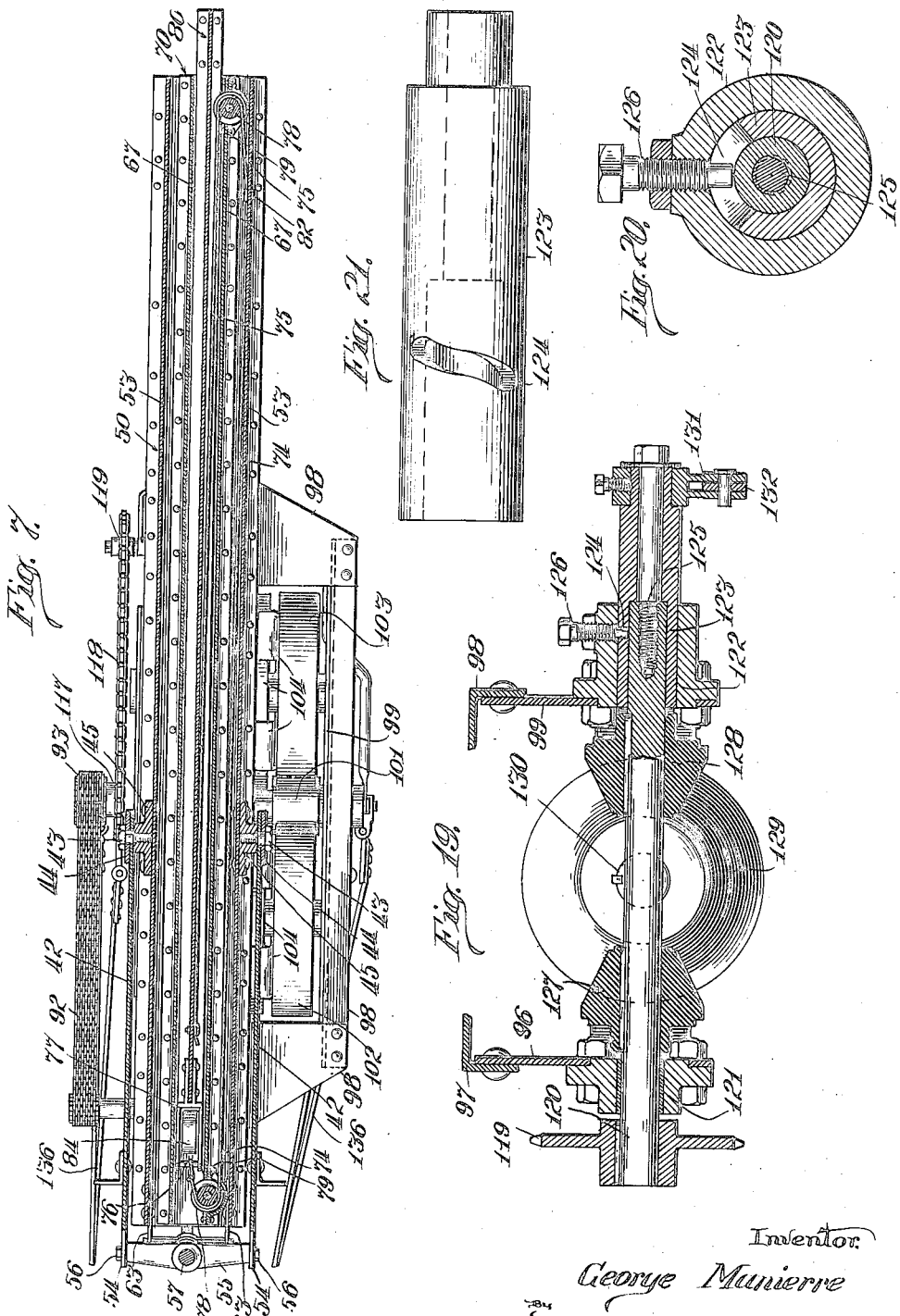

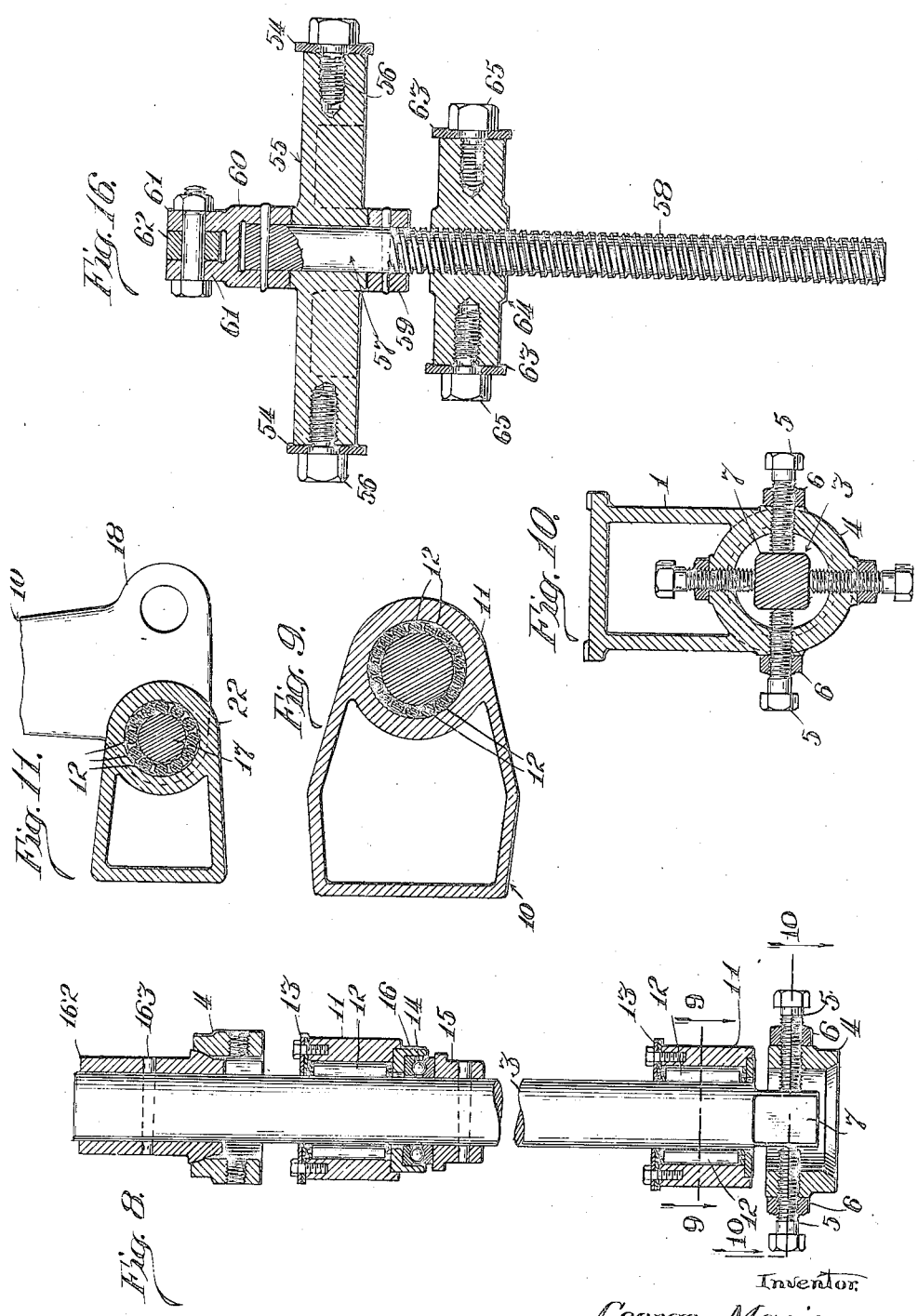

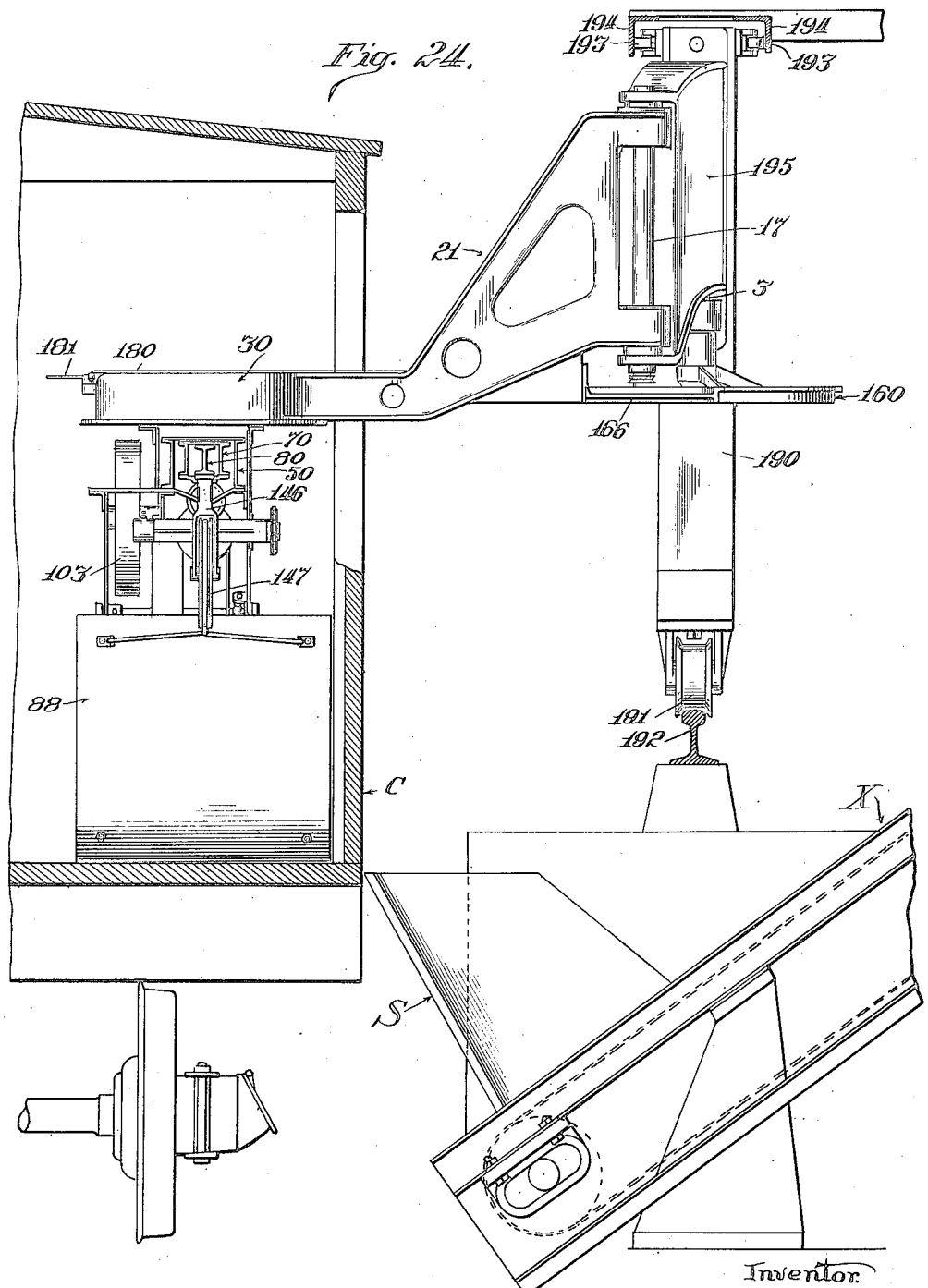

1,440,400

UNITED STATES PATENT OFFICE.

GEORGE MANIERRE, OF MILWAUKEE, WISCONSIN.

CAR UNLOADER.

Application filed January 10, 1921. Serial No. 436,354.

*To all whom it may concern:*

Be it known that I, GEORGE MANIERRE, a citizen of the United States, residing at Milwaukee, county of Milwaukee, and State of Wisconsin, have invented a new and useful Improvement in Car Unloaders, of which the following is a specification.

This invention relates to car-unloaders.

It is an object of the invention to provide a device of this kind, which can readily be introduced into, or removed from, a car through a narrow door, and which can be adjusted within the interior of the car so as to extend to either end thereof.

It is also an object of the invention to provide on a device of this kind, means for selectively extending the unloader to different lengths, whereby the device may act upon portions of the bulk material which is at different distances from the car door.

Another object of the invention is to provide actuating mechanism for a discharge element, which forms a part of the unloader and which is reciprocated on a pre-determined path of variable length, whereby through its movement in one direction, bulk material is dragged from the interior of the car towards the door; while by the movement in the other direction, the element is permitted to glide over the material without dragging it.

An object of the invention is also, to maintain the support for the actuating mechanism sufficiently raised from the floor of the car to permit the discharge element to scrape the material through the car door, into a suitable receptacle or onto a conveyor.

It is furthermore an object of the invention to provide a support for the discharge element, which can be extended, and which after its adjustment to extended position may remain in this adjusted position, while the discharge element or scraper is actuated to remove the material from the car.

Another object of the invention is to provide a boom mechanism consisting of several telescoping members which are flexibly interconnected and which upon a driving movement being imparted to one of said members, move simultaneously in the same direction, but at different rates of speed, whereby an extension or retraction of the boom structure is attained.

It is another object of the invention to support the adjustable boom structure from a turn table with respect to which the boom structure may be deflected in a vertical plane, thereby facilitating the engagement of the discharge element with the heap of the material at different levels from the floor of the car.

The invention also contemplates the provision of means for locking the turn table on which the extensible boom is supported in any desired position to prevent further rotation of the boom and turn table; and the invention also contemplates the provision of locking means whereby the structure supporting the turn table may be locked in any one of a plurality of different positions, and may again be released, the locking and releasing being possible at a position remote from the parts which have been brought into locking engagement.

Another object of the invention is to arrange means for locking the turn table, for locking or releasing parts of the supporting structure for actuating the discharge element from a common point, whereby a single attendant may control the entire operation of the unloader.

Another object of the invention is to provide a support which permits movement into either of two cars, the supporting structure being either portably or fixedly mounted.

A further object when supporting structure is portably mounted and the unloader double acting, is to permit unloading from two trains on to a conveyor running beneath the supporting structure.

Another object is to provide a support that can be mounted upon the leg of a coal handling bridge or other similar portable structure for unloading cars to a conveyor also supported by bridge structure which discharges the coal or other material to the storage pile.

With these and numerous other objects in view, several embodiments of the invention are described in the following specification in which reference is made to the accompanying drawing.

Fig. 1 is a top plan view of the unloader in position in a box car which is shown in horizontal section;

Fig. 2 is a side elevation of the loader within a car which is shown in vertical section;

Fig. 3 is a top plan view of the two supporting arms on a somewhat larger scale;

Fig. 4 is partly side elevation and partly section of one of the supporting arms, also showing parts of the boom and the actuating mechanism therefor in transverse section on line 4—4 of Fig. 1 or 5;

Fig. 5 is a side elevation and partly section on line 5—5 of Fig. 4 of the rear portion of the boom and actuating mechanism of the same;

Fig. 6 is a side elevation and a vertical section through the boom and parts of actuating mechanism on line 6—6 of Fig. 1 or 5;

Fig. 7 is a partly top plan view of the actuating mechanism and also a longitudinal horizontal section of the boom in contracted condition on line 7—7 of Fig. 6;

Fig. 8 is a sectional view of the main supporting pivot taken on line 8—8 of Fig. 3;

Fig. 9 is a transverse horizontal section through a bearing on line 9—9 of Fig. 8;

Fig. 10 is a horizontal sectional view through a supporting bracket and the pivot post on line 10—10 of Fig. 8.

Fig. 11 is a horizontal sectional view through another roller bearing on line 11—11 of Fig. 4;

Fig. 12 is a vertical sectional view through the turn table for the boom;

Fig. 13 is a fragmentary sectional view on a larger scale through a locking device for the arms, on line 13—13 of Fig. 3;

Fig. 14 is a section on line 14—14 of Fig. 3, and partly elevation of the actuating means for the locking device of the arms;

Fig. 15 is part elevation and part section on line 15—15 of Fig. 3 of a cam device for locking the turn table;

Fig. 16 is a sectional view through the boom tilting device on line 16—16 of Fig. 6;

Fig. 17 is a horizontal section on a larger scale on line 17—17 of Fig. 2 through a clutch actuating device;

Fig. 18 is a detail view of the device for maintaining the clutch actuating mechanism normally in neutral position;

Fig. 19 is a section on a larger scale showing the friction gearing for extending the boom;

Fig. 20 is a transverse vertical section through the shaft of this friction gearing;

Fig. 21 is a detail elevation of a sleeve which forms a part of said gearing;

Figs. 22 and 23 are diagrammatical elevations of the friction drive means for the cable drums in different operative positions;

Fig. 24 is a front elevation and part section of a modified embodiment of the unloader.

A post P made of concrete or similar material, which projects from the top surface of a foundation F adjacent the track T (Figs. 1 and 2), serves as a support for several brackets 1 which are anchored to said post by means of bolts 2 (Figs. 2, 14) and which brackets serve for holding a stationary pivot post 3. The brackets 1 terminate each in an annular member 4, Fig. 10, and holding screws 5 may extend through one of the rings 4, whereon they are adjustable by nuts 6, to impinge against the squared end 7 of the post 3, so as to prevent the rotation of said post and to hold it securely in central position with respect to the upper bracket 1.

An arm 10 in the form of an angular casting is rotatably secured to the pivot post 3 by means of bearing lugs 11 (Fig. 2) disposed near the upper and lower end of the arm. Bearing rollers 12 (Figs. 8 and 9) serve for facilitating the rotation of the arm structure 10 about the pivot post. The rollers are rendered accessible by a removable top plate 13, and the axial thrust is absorbed on the upper bearing 11 by a ball bearing 14 which is inserted between the collar 15 pinned to the post 3 and the thrust plate 16 closing the lower end of the bearing 11.

The free end of the arm structure 10 serves for supporting a similar pivot post 17, as shown in Fig. 4. The arm 10, therefore, has a top plate 18 and a bottom plate 19 provided with aligned openings in which the pivot post 17 may be inserted. This pivot post is provided with an enlargement 20 near its top to prevent axial displacement of the post downwardly. The post serves for rotatably holding an angular arm structure 21 by means of bearing lugs 22, one of which is near the top of the arm 21 while the other one is near the lower end thereof. The axial thrust, due to the weight of the arm structure 21, is absorbed by a ball bearing 23 which rests on the bottom plate 19 and which is separated from the lower bearing lug 22 by means of a thrust collar 24. The detail section of Fig. 11 also shows that a plurality of bearing rollers 12 are inserted in the interspace between the post 17 and the lug 22 so as to distribute the strain uniformly about the circumference of the post.

Owing to this double pivotal support of the unloader, comprising the two supporting arm structures 10 and 21, it is obvious that a very large number of different positions may be occupied by this combined structure with respect to the stationary upright anchor post P of the foundation (Fig. 1) and that the two arms may also be pivotally displaced relatively to each other in any desired way so as to enable the attendant to swing the entire machine through a relatively narrow door of a car or to withdraw it from the same, as required. It will furthermore be seen that in this adjusting movement of the machine these parts are maintained in definite planes and that the weight and friction is taken up by ball and roller bearings, respectively.

The arm 21 has at the free end an annular casing 30 on which a turn table 31 is rotatably carried. The casing 30, which in the embodiment shown (Figs. 4 and 12) is formed integral with the arm 21, has an inwardly projecting flange 32 on which a large ball bearing 29 is mounted. The upper ball race is seated in an annular shoulder of a supporting ring 33 which thereby is centrally disposed with respect to the casing 30 at the end of the arm 22. The supporting ring 33 is firmly united by means of a relatively large number of screws 34 with the lower ring 35 of the turn table 31. This lower ring has a supporting flange 36 projecting outwardly below a circular bottom wall 37 of the casing 30 and another ball bearing 38 is inserted between the flange 36 and the wall 37.

From this construction it is obvious that all strains exerted by the weight of a boom, which may be connected with the turn table, are transmitted to the arm 21 through ball bearings and that the movability of the turn table with respect to the arm will be uniformly maintained immaterial of the weight which is supported by the turn table and immaterial of the direction of strain which may be exerted by said load on the table.

A pair of horizontal flanges 39, both at the same distance from the center of the turn table (Fig. 4), extend parallel to each other below the ring 35, and to these flanges a sheet metal structure having at its top ends the angle irons 40 is secured by means of bolts 41 (Fig. 4). This sheet metal structure comprises the side walls 42 (Figs. 4, 5) which extend parallel to each other and which project beyond both ends of the pertaining angle irons 40 (Fig. 5).

The connection of the boom structure sheet metal with the frame just described is effected by trunnion screws 43, as shown in Figs. 4, 5 and 7, the trunnion screws passing through cast plates 44 on the sheet metal walls 42 and being secured on the boom structure by means of bearing brackets 45.

The boom structure itself comprises a plurality of elements which are telescopingly slidable relatively to each other and relatively to an element which is held against longitudinal displacement with respect to the turn table. This last named stationary hollow element 50 is preferably constructed in the form of a box girder or the like, having the top and bottom members 51 and 52 and lateral walls formed by channel irons 53 to which the brackets 45 for the trunnions 43 are fixedly secured. This boom structure, which is movable about the axis of the trunnions 43, may, therefore, be adjusted angularly with respect to the plane of the turn table 31, the axis of the trunnions extending at right angles to the axis of the table.

For the purpose of tilting the boom about the trunnions 43 a tilting device, shown in Figs. 5, 6 and 16 may be used. The projecting rear extensions 54 of the plates 42 are united by a transverse bar 55 which is secured pivotally to the plates by trunnion screws 56 (Fig. 16). A spindle 57, having a threaded portion 58, is rotatably supported on a smooth portion in the transverse bar 55. Longitudinal displacement of the spindle 57 with respect to the bar 55, however, is prevented by a collar 59 pinned to the spindle below the bearing bar, while another collar 60 is fixed to the spindle above the bar 55. The collar 60 terminates at its top in a fork 61 between whose prongs a crank 62 is pivotally secured. The channel irons 53 of the boom have at their rear end (Fig. 5) slanting bracket plates 63 which support between them a casting 64 formed as a nut in engagement with the threaded part 58 of the spindle 57. The connection between the bracket plates 63 and the nut 64 is effected by trunnion screws 65.

The rotation of the spindle 57 therefore will cause a longitudinal displacement of the nut 64 thereon and as this nut is connected with the boom structure 50, the latter will be tilted about the trunnions 43 through which it is indirectly secured to the turn table.

The boom structure comprises extension members through which its length may be varied so as to reach to the rear end of the car after it has been introduced into the same. Two of these extension members, in telescopic arrangement, are illustrated.

The outer extension member 70 also is constructed as a hollow beam or girder comprising a top plate 66, lateral plates 67, preferably in the form of channel irons, and a bottom plate 68. The bottom plate is associated with a rack bar 69 having downwardly directed teeth which are adapted to cooperate with a worm 71, the actuation of which will be described below. For the purpose of maintaining the extension member 70 uniformly spaced vertically with respect to the plates 51 and 52, rollers 72 are rotatably secured to the boom casing 50, as indicated in Fig. 6, said rollers acting upon the top and bottom surface of the outer extension member 70 through slots 73.

A second extension member 80, preferably constructed in the form of an I-beam is slidably mounted within the extension member 70. While the longitudinal displacement of the outer member 70 with respect to the boom casing 50 is produced through the operation of the worm 71, the inner extension member 80 may be caused to travel forwardly or rearwardly at a differential speed by some other means.

In the embodiment shown two tension members in the form of ropes 74 and 75 are provided. The rope 74 is secured (Fig. 7)

at one of its ends to a pin 76 in a bifurcated bracket 77 at the rear of the inner extension member 80. Sheaves 78 are rotatably supported near the front end and near the rear end of the outer extension member 70 by means of brackets 79 secured in the side walls thereof. The other flexible member 75 is also secured to the rear end of the I-beam 80 and both tension members are trained about the sheaves 78. The other ends of the ropes 74, 75 are fastened in a common holding screw 82 near the front end of the stationary casing 50.

From this arrangement of the ropes 74, 75 it is obvious that upon displacement of the outer extension member 70 with respect to the boom part 50, which remains at rest, the inner member 80 will move in the same direction, but twice as far as the outer member 70. The tension members 74 and 75 hence serve for causing displacement of the inner boom part 80 at differential speed, upon displacement of the outer extension member 70 which is produced through the worm 71 acting on the rack bar 69.

The inner extension member 80 is maintained in proper spaced relation with respect to the outer extension member 70 by a roller 84 rotatably mounted in bracket 77 at the rear end of the inner beam 80, and having a diameter corresponding to the distance between the walls 66 and 68 of the outer extension member. Another roller 85 may be rotatably secured in bearing brackets 86 near the free end of the beam 70, acting frictionally on the lower surface of beam 80, Fig. 6.

The tension members 74, 75, therefore, do not ordinarily coact with the boom elements for the purpose of moving a discharge element from the end of the car towards the door or vice versa, but they serve principally for extending or contracting the boom structure. A discharge element, in the form of a scraper plate 88, is movably connected with a bracket 87 which is inserted in adjacent ends of flexible actuating elements 90 and 100. The discharge element 88 is suspended from the bracket 87, so that it will automatically move into the position illustrated in Fig. 2 and maintain this position while it is being pulled from the end wall of the car towards the door, thereby pushing the material towards the door. The pressure of the material against the plate 88 would have a tendency to turn the same (as seen in Fig. 2), in anticlockwise direction, thereby rendering it inoperative. A chain 89 inserted between the scraper element 88 and the other end of the attachment bracket 87, prevents this movement. If, however, the scraper element is moved in opposite direction, from the door to the end of the car (so as to arrive in a position in which a new discharge movement can be initiated) the scraper element will be automatically folded towards the bracket 87, and the chain 89 will not offer any obstruction to this pivotal movement of the scraper plate about its point of suspension.

The mechanism for actuating the tension elements 90 and 100, through which the scraper plate may be alternately advanced from the door to the end of the car and vice versa, is driven by the motor 91 which is mounted on the bottom plate 52 of the boom part 50. This motor, as will be seen from Figs. 5 and 7, drives by means of a "silent chain" 92, a pulley 93 at the free end of a counter shaft 94. This countershaft is supported in bearings 95 secured to plates which extend downwardly from the boom part 50, Figs. 5, 18, 6. From Fig. 4 (and 7) it will be seen that the inner plate 96 is secured to the bottom wall 52 of the boom part 50 by angle irons 97, while the outer plate 99 is fastened similarly to horizontal lateral extension plates 98 also rivetted to the bottom wall 52. The space between the two plates 96, 99 serves for receiving the actuating mechanism of the unloader. The countershaft 94 has at the end opposite the pulley 93 a friction roller 101. This friction roller may be of ordinary construction and may either consist of metal or wood having on its outer surface a covering of raw hide or some other suitable material.

Friction pulleys 102 and 103 are carried in suitable bearing brackets 104, Fig. 5, which are supported between the extension plates 98 on the lower face of the boom, and in the outer plate 99. These friction disks are each provided with a hub 105, Fig. 4, which is united with a hub extension of a pinion 106, the friction disk and pinion rotating loosely on a shaft 107. This shaft is equipped at its ends with reduced eccentric extensions 108 through which it rests in the bracket 104 and plate 99, respectively.

Each of the pinions 106, associated with the friction disks 102 and 103, respectively, is in operative engagement with an internal gear rim 109 formed on each of the cup-shaped enlargements 110, 111 of the cable drums 112, 113, rotatably supported on shafts 114. The latter are carried in bearings 115 of the brackets 104 and in bearings 116 of the plate 96.

Upon rotation of one or the other of the pulleys 102, 103 the pinions 106 are rotated, transmitting rotation to the internal gear 109 and thereby also causing the rotation of the appertaining drum 112 or 113.

The shaft 94 on which the chain pulley 93 is mounted also carries an ordinary drive sprocket 117 over which a chain 118 is trained to drive a sprocket 119 fixed on a transverse shaft 120, Fig. 19, which is supported between plates 96 and 99 by bearings 121, 122 inserted on one side of said wall. The bearing 122 supports a sleeve 123 which surrounds the shaft 120 and which is provided with an S-shaped cam slot 124. (Fig. 21.) This sleeve is fastened to the shaft 120 by a screw 125, so that the shaft may rotate within the sleeve, but will be moved axially upon axial movement of the sleeve. A set screw 126 is threaded through the bearing 122, which is held immovable, and a reduced portion of said screw enters the S-shaped cam 124 of the sleeve 123 (Fig. 20). If, therefore, the sleeve is turned, it will also be displaced axially relatively to the bearing 122, and this axial movement is transmitted to the shaft 120.

Two conical friction disks 127 and 128 are keyed to the shaft in a position in which normally neither one of them is in engagement with a friction disk 129 to be driven thereby and mounted at the end of the drive shaft 130. Normally no rotation is transmitted to this shaft; if, however, the shaft 120 is moved to the right or to the left transversely of the boom the cones 127 or 128, respectively, may be brought into engagement with the friction disk 129 and may thereby rotate the same in one or the other direction. Whenever one of these driving cones 127 or 128 is brought into operative engagement with the disk 129 the other cone automatically is further removed from operative position, thereby preventing a driving engagement by both of these cones simultaneously.

For the object of imparting a turning movement to the sleeve 123, and for thereby shifting the shaft 120, with the cones 127 and 128 in axial direction, the reduced portion of the sleeve 123, is provided with an arm 131, which is fixed thereto. The outer end of this arm is bifurcated as shown in Fig. 19, and a link 132, Fig. 2, is pivotally connected with the end of the arm. The other end of the link 132 is similarly connected to an arm 133, which is fixed to a shaft 134, supported in the plates 96 and 99 of the sheet metal structure, wherein the cable drums and gearing are housed. The shaft 134 projects outwardly from the plates 99, and carries at the projecting ends of the arms 135, on each of which a handle 136 is secured. By moving this handle up or down, the shaft 134 is rotated, and through the arms 133, 131 and a link 132, the sleeve 123 is turned, and at the same time displaced in axial direction owing to the provision of the slot 124 and pin 126.

A yielding lock is provided for normally retaining the handles 136 in neutral position, and for securing thereby the shaft 120 in a position in which neither of the cones 127 or 128 is in operative engagement with the friction disk 129. An arm 137, Fig. 7, which is fixed on the shaft 134, adjacent the plate 96 of the sheet metal structure, is provided on its edge with a notch 138; a latch bar 139, Fig. 18, is slidably carried within a bracket 140, which is secured to the plate 96 and this latch bar carries on its projecting end a roller 141 adapted to be seated in the notch 138, as shown in Fig. 18. If adjustment of the shaft 120 is desired, the operator has to pull the handle 136 up or down, thereby compelling the roller 141 to leave the notch 138; the return of the structure shown in Fig. 18 to neutral position, is facilitated through the pressure which the spring 142 exerts upon the roller bar 139.

The shaft 130 on which the friction disk 129 is mounted is connected through a universal coupling 143 with the shaft 144, carrying the worm 71. This shaft is carried in bearings 145 (Fig. 6) which are secured to the bottom plate 52 of the boom casing 50. The worm as stated above, is in engagement with the rack 69 on the lower face of the outer extension member 70 of the boom structure.

The inner extension member 80 carries at its forward end and projecting downwardly therefrom, a bracket 146 on which a cable sheave 147 is rotatably mounted. One end of the tension member 90 is secured to the bracket 87, and this tension member being trained over the sheave 147 is secured at its other end to the cable drum 112. The other tension member 100, secured to the opposite end of the bracket 87, is trained over a sheave 148 which is supported by an angle iron bracket 149, carried at the rear end of the turn table structure 42, and the end of this cable 100 is fixed to the circumference of the cable drum 113.

Both of these drums are loosely mounted on their shafts and may be rotated when the friction pulleys 102 or 103, respectively, are driven. The latter are driven selectively in alternation through the pulley 101, which is constantly rotated by the motor 91. For bringing either one of these friction pulleys 102 or 103 into operative engagement with the small pulley 101, the excentric journals 108 are turned, whereby the central portion of shafts 107, on which the friction disks are carried, are swung about axes eccentric to those of the pertaining journals. The mechanism for turning the excentric journals 108 comprises on each of the shafts 107 an arm 150, the free ends of these arms 150 being connected by links 151 with opposite ends of a rocking bar 152, which is pivotally supported on the shaft 153 passing transversely through the sheet metal housing, composed of the plates 99 and 96. One end of the rocking bar 152 is furthermore flexibly associated with a handle 154 similar to the handle 136. A latch including an arm 137 and other parts similar to those shown in Fig. 18, may be secured on plate 99, Fig. 17, for yieldingly holding the handle 154 in neutral position.

The shafts 134 and 153 pass through both plates 99 and 96 and carry handles 136 and 154, respectively, at both ends. The handles 154 are united with the rocking bar 152 through a link 154', which contains a vertical pivot 155, Fig. 17, and a spring 156. This spring rests at one end against the bar 152 and at the other end against the link 154'. It has a tendency to maintain the handle 154 in alignment with the bar 152. If for the purpose of facilitating the operation either of the handles 154 is swung in a horizontal plane about the pivot 155, the torsion spring 156 will have a tendency to restore this handle to that position in which it is alined with the bar 152.

The construction which is here described, with reference to the handle 154, is also applied to the handle 136 which serves for connecting the shaft 130 to the positive driving means of the machine.

Figs. 22 and 23 illustrate diagrammatically the position of the elements for imparting the positive drive to either one of the friction pulleys. The arms 150 are offset at right angles with respect to each other on their shafts 94. In one operative position with the handle 154 lowered, the pulley 101, contacts and drives the friction disk 102, while in the raised position of the handle 154 the friction disk 103 is moved into engagement with the pulley 101, while at the same time the other disk 102 is thrown into inoperative position. If the handle 154, however, is in horizontal position, Fig. 6, no drive is transmitted to either friction disk.

The swinging movement of the arm 10 about the post 3 may be limited by a lug plate 158 (Fig. 3) which is secured to the top surface of the arm 10, and which after rotation of said arm through a predetermined arc, engages a lug 159 which may be formed integral with, or secured to a spider segment 160, which is also secured to the post 3.

The spider segment is furthermore equipped with an arm 161, which projects from the segment in radial direction rearwardly towards the bracket 1 and enters a notch in said bracket thereby holding the spider 160 against rotation. The hub 162 of the spider is seated on a collar 4 of the bracket, as will be seen from Fig. 8, the contacting surfaces of the hub and bracket being of spherical shape so as to facilitate the adjustment of the parts. The spider 160 being held immovable with respect to the bracket also serves for holding the post 3 against rotation, a pin 163 passing through the hub 162 and through the post.

The rim 164 of the spider has an arcuate, horizontally projecting flange which is provided with a plurality of openings 165, (Fig. 3).

A similar spider 166 is secured to the arm 21, (Fig. 4). The spider 166 terminates in a lug 167 which is fixed to a bracket 168 projecting from the top surface of the arm structure 21. The spider 166 also is provided with a curved flange 169, having openings, and the openings and the two ring flanges serve for receiving locking bolts 171, 172 or plungers whereby a movement of either spider relatively to the other, is rendered impossible unless the locking bolts are withdrawn.

This locking device for maintaining the arm 10 in predetermined relation with respect to the arm 21, as for instance in the relation in which they are shown in Fig. 3, or in one of several other possible relative positions, comprises a block 170 on arm 10, and through which the two plungers 171 and 172 slidably project. Pins 173, extending from the lower ends of the plungers to both sides thereof, enter notches of bars 174 whereby the two plungers move simultaneously when the bars 174 are shifted in vertical direction. The bars 174 are equipped with a projecting pin 175, which is engaged by the prongs of the arm 176, of a bell crank pivoted at 177 on a wall of the supporting arm 10. The other arm 178 of the bell crank lever is attached to the spring 179, which has a tendency to maintain the bell crank lever in the position indicated in Fig. 14 in which both of the plungers are in locking engagement with the spiders 160 and 166, thereby preventing the displacement of one of the arm structures with respect to the other arm. If it is desired to swing the arms 10, 21 relatively to each other, the withdrawal of the locking plungers is effected by a cord or cable 180, secured at one end to the arm 178 and at the other end to the bell crank lever 181, which is pivoted to a lug on the casing 30. (Fig. 3.) One arm of this bell crank is constructed as a handle to facilitate manipulation. The cable 180 passes through the hollow arm 21 and is guided over a sheave 182 in the arm. The attendant therefore is in position to release the two arms 10 and 21 from locking engagement, to swing them to a different position, and then to lock them again without leaving his place near the casing.

The invention also provides means for limiting the swinging movement of arm 21 with respect to the other arm, and for this purpose a lug 183, Fig. 4, is fixedly secured to the top surface of the arm 21, adapted to strike a projection 184 on the plate 18, which is secured to the top surface of the other arm 10. By this means the maximum reach of swinging movements of both arms is defined through the projections 158, 159 and 183, 184 respectively.

The invention also provides means for locking the turn table against rotation with respect to the casing 30. One or several brackets 185, projecting from the bottom surface of the flange 36, Fig. 15, support at their free end excentrically a roller 186 which is fixed to a handle 187. It is obvious that upon turning the handle 187 downwardly the turn table 36 is free to rotate within the casing. If the handle 187, however, is swung upwardly into the position illustrated in Fig. 15, a clamping effect will be produced by the cam 186, preventing the rotation of the turn table 36 and holding thereby this table as well as the boom structure supported therefrom, in a predetermined angular position relative to the casing.

In the modification illustrated in Fig. 24, the construction of the boom, the actuating mechanism, and the pertaining parts, are the same as described above. While, however, in the embodiment of Figs. 1 to 23 the arm 10 is movably secured to an anchor post through the brackets 1 and may swing relatively to said post, and while in this embodiment the arm 21 is placed so as to have the casing 30 slightly higher than the upper bearing of said arm, in the modification illustrated in Fig. 24, the arm structure 10 is not supported from a concrete post and the arm structure 21 is placed inversely as compared with the structure shown, for instance, in Fig. 4. In place of the rigid post "P" this embodiment comprises a traveling vertical beam 190, having at its foot end one or more rollers 191, which are adapted to travel on a rail 192, while the top of the post 190 has lateral rollers 193 engaging the vertical flanges of suitably spaced angle irons 194, which serve as an upper guideway for the structure.

This beam 190 carries brackets for receiving the pivot 3, on which an arm structure 195 is rotatably secured and the free ends of this arm structure support a pivot post 17 about which the arm structure 21 may turn. While in the first described embodiment the spiders 160 and 166 are secured in a plane on top of the arms in the modification of Fig. 24, these locking spiders are in a level below the arms. In other respects the construction is not altered but it is obvious that owing to the traveling bar 190 this unloader may be moved to the car and along the same, while in the first embodiment the car must be moved to a place where the unloader can be introduced into the same.

The operation of the device is about as follows:

Referring to the embodiment illustrated in Figs. 1–23 inclusively, the car "C" is advanced to a position at which the door is above the gap between the two blocks "F" of the foundation, in which gap the conveyor X of any desired construction may be located, for instance as shown in Fig. 24. A chute S leads from the supporting structure of the conveyor to the door of the car.

The unloader which may then be in the position indicated in dotted lines in Fig. 1 is now introduced into the car by swinging the boom casing containing the retracted extension members through the door into the car and also swinging the arm 21 about the post 17 until this arm structure will occupy the position shown in Fig. 1 in full lines. The movement of the arm 21 with respect to the arm 10 requires the release of the locking plungers 171 and 172, which release, however, can be effected by the operator who by this time may have taken the position in the interior of the car. After the arm has been introduced to the position shown, the turn table with the contracted boom thereon may be swung so as to extend the boom, for instance, parallel to the inner wall of the car as indicated. The turn table may then be locked by operation of the handle 187, while the plungers 171 and 172 will automatically enter the holes which are then in opposition to each other in the flanges of the spiders.

The boom may then be elongated if this should be desired, by throwing the motor 91 into operation and manipulating the handle 36 so that the cones 127 or 128, respectively, rotate while in frictional engagement with the disk 30. The worm 71, being in mesh with the rack 69 on the lower face of the outer extension member 70, will slowly displace this extension member and this portion can be continued as long as desired.

In the advance movement of the outer extension member 70 the inner extension member 80 also is advanced and travels at twice the speed of the inner extension member, until through a movement of the handle 136 the rotation of the worm 71 is interrupted. The space within the car immediately adjacent the door of the car may have been cleared of the material by pushing the latter through the door into the chute and on the conveyor. If the interior of the car does not afford space for completely extending the boom structure a partial extension may be effected and in the subsequent operation of the scraper 88 a larger space will be cleared in the neighborhood of the car door. The reciprocation of the scraper takes place by alternately bringing either one of the friction pulleys 102 and 103 into driving contact with the friction pulley 95. When the pulley 102 is in operation, the cable drum 112 will be positively driven to wind up the tension member 100, while at the same time the other cable drum 113 is rotated through the movement of the flexible tension member 90. If, however, the friction pulley 103 is thrown into engagement with the drive pulley 95, the cable drum 113 is positively rotated to wind up the cable 90 while the drum 112 then rotates, unwinding the cable 100 whereby the scraper is returned towards the end of the boom to arrive again at a position to which the operation of discharge may be started over. This reciprocation of the scraper longitudinally of the boom, which may be designated as the secondary supporting structure, and angularly with respect to the arms 10, 21, forming the primary supporting structure, is repeated until all of the material within reach of the boom has been cleared; after having released the turn table lock 185, the boom may be rotated to clear the space in another part of the car.

The boom may then be further extended towards the end of the car and the proper adjustment to a certain level of the heap of material may take place by rotating the spindle 70. Again the scraper may be moved forth and back until all material has been removed. During this succession of steps the adjustment of the arms 10 and 21 may remain undisturbed until at least one half of the car, as for instance to the left from the car door, is entirely cleared of the material. This clearing operation requires principally a repeated forth and back movement of the scraper plate during which a readjustment of the boom extension is not frequently called forth.

After one side of the car has been entirely cleared of the material, the secondary supporting structure may be contracted either completely or partly, and the primary supporting structure 10, 21, also may be readjusted to permit the removal of the material from the other half of the car. It may become necessary for this purpose to withdraw the arm structure partly from the interior of the car. The release of the arm 21 with respect to the arm 10, the readjustment of the boom so as to project over a certain length of the car only, the operation of locking and releasing the turn table, the tilting of the boom structure to the different levels, and other operations, may all be effected by an operator who takes his position in the interior of the car adjacent the casing 30, the handles or arms 136 and 154, the bell crank levers 148 and cam lever 185, all being disposed close together and either directly on the turn table or below the same.

I claim:

1. In a device of the character described the combination of a plurality of pivotally interconnected supporting arms, a discharge element and a motor-driven mechanism carried by said supporting arms for reciprocating the discharge element.

2. In a device of the character described the combination of a plurality of pivotally interconnected supporting arms, a discharge element, a secondary support for the discharge element movably mounted on one of said arms, and a mechanism for reciprocating said discharge element.

3. In a device of the character described the combination of a plurality of pivotally interconnected supporting arms, an extensible secondary supporting structure carried by one of said supporting arms and movable relatively to several of said arms, a discharge element associated with said secondary supporting structure and motor mechanism on the secondary supporting structure for actuating the same and the discharge element.

4. In a device of the character described the combination of a plurality of pivotally interconnected supporting arms, a turn table rotatably mounted in one of said arms, a secondary supporting structure fixed to said turn table, a discharge element and mechanism carried by the turn table for actuating the discharge element.

5. In a device of the character described the combination of a plurality of pivotally interconnected supporting arms, a turn table rotatably carried by one of said arms, a secondary supporting structure fixed to said turn table and motor mechanism on said secondary supporting structure for actuating the same and the discharge element.

6. In a device of the character described the combination of a pair of pivotally interconnected supporting arms, one of said arms terminating in a cylindrical casing, a turn table movably mounted within said casing and secured therein against axial displacement, a supporting structure fixed to the turn table, a discharge element and mechanism carried by the turn table for actuating said supporting structure and said discharge element.

7. In a device of the character described the combination of a primary supporting structure, a post to which it is pivotally secured, a turn table secured to the primary supporting structure, a secondary supporting structure fixed to said turn table, a discharge element movably attached to the secondary supporting structure, and mechanism carried by the secondary structure for reciprocating parts of said secondary supporting structure relatively to other parts thereof and for actuating the discharge element.

8. In a device of the character described the combination of a primary supporting structure, a post to which it is pivotally secured, a secondary supporting structure rotatable with respect to the primary supporting structure, a discharge element movable longitudinally with respect to the secondary supporting structure and self-contained mechanism for actuating the discharge element and for extending the secondary supporting structure, said mechanism being carried by the secondary supporting structure.

9. In a device of the character described the combination of a primary supporting structure, a post to which is rotatably secured, a secondary supporting structure rotatable with respect to the first mentioned supporting structure, a discharge element, and mechanism for actuating the discharge element longitudinally with respect to the secondary supporting structure and angularly with respect to the first mentioned supporting structure and for extending the secondary supporting structure.

10. In a device of the character described the combination of a pair of arms which can be folded towards each other, an additional supporting structure which can be rotated relatively to said arms, a discharge element on the supporting structure, and means on the supporting structure for reciprocating said discharge element relatively of the supporting structure.

11. In a device of the character described the combination of a primary supporting structure, a secondary supporting structure, a turn table interposed between the two structures, a cylindrical casing associated with the primary structure, a flange on said cylindrical casing, and ball bearings inserted between said flange and said turn table above and below said flange.

12. In a device of the character described the combination of a primary supporting structure, a secondary supporting structure, a turn table interposed between the two structures and rigidly secured to one of the same, a cylindrical casing associated with the other structure, a horizontal wall in said cylindrical casing, a pair of horizontal walls forming part of the turn table, and ball bearings between the walls of the turn table and said wall of the casing.

13. In a device of the character described the combination of a primary supporting structure, comprising a pair of pivotally interconnected arms, an anchor post, a pair of brackets fixed to said anchor post, a pivot shaft adjustably secured to said brackets, a lug plate mounted on one of said arms, and a lug on one of said brackets adapted to be engaged by the lug plate of the arm to limit the rotation of said arm with respect to said brackets.

14. In a device of the character described the combination of a primary supporting structure, comprising a pair of pivotally interconnected arms, a pivot post from which said supporting structure is rotatably suspended, a lock element rigidly connected with said pivot post, a locking device carried by one of said arms, another lock element carried by the other arm of the supporting structure, and means in the locking device for holding said second lock element in pre-determined position with respect to said pivot post.

15. In a device of the character described the combination of a plurality of pivotally interconnected supporting arms, a pivot post from which the supporting structure is rotatably suspended, a locking device carried by one of said arms, and separate lock elements associated with the other arm and with the pivot post respectively adapted for cooperation with said locking device for holding the arms in pre-determined relation to each other and for holding the supporting structure in pre-determined relation relative to the post.

16. In a device of the character described the combination of a supporting structure, comprising pivotally interconnected arms, a pair of rims in opposition to each other, one of the rims being carried by one of said arms, a locking mechanism carried by the other arm, and means in said locking mechanism for preventing displacement of one of said rims with respect to the other.

17. In a device of the character described the combination of a supporting structure, comprising a pair of pivotally interconnected arms, a post from which said supporting structure is movably suspended, an arcuate element rigidly connected to said post, another arcuate element rigidly connected to one of said arms, and locking means connected with the other arm adapted for cooperation with both of said arcuate elements for holding the supporting structure against displacement with respect to the post, and for holding the arms against displacement with respect to each other.

18. In a device of the character described the combination of a supporting structure, comprising pivotally interconnected arms, a post on which the supporting structure is pivotally mounted, a spider fixed to said post, a spider rigidly connected with one of said arms, each of said spiders being provided with openings, locking plungers carried by the other arm, and means for introducing said locking plungers into the openings which are in opposition to each other.

19. In a device of the character described the combination of a supporting structure, comprising pivotally interconnected arms, a post from which the supporting structure is movably suspended, a locking device on one of the arms adapted to hold the arms against movement relatively to each other and relatively to the post, and means for normally maintaining said locking device in operative position.

20. In a device of the character described the combination of a supporting structure, comprising pivotally interconnected arms, a post to which the supporting structure is movably secured, a spider fixed to the post, a spider fixed to one of said arms, and a locking mechanism secured to one of said arms in cooperation with both of said spiders for holding the arms against movement relatively to each other and to the post, said locking mechanism comprising a pair of plungers, bars connecting said plungers, a bell crank lever engaging said bars, means for normally forcing said plungers to locking position, and means controllable from a remote position for releasing the locking mechanism.

21. In a device of the character described the combination of a supporting structure, including an arm, a turn table associated with said arm, a secondary supporting structure pivotally connected with the turn table, a discharge element secured to the secondary supporting structure, a motor in said secondary supporting structure, and means associated with the motor for actuating said supporting structure and said discharge element independently of each other.

22. In a device of the character described the combination of a supporting structure, including an arm, a turn table movably supported by the arm, a secondary supporting structure pivotally mounted on the turn table, a discharge element movably associated with the secondary supporting structure, a motor mounted on the turn table and movable therewith, and means associated with the motor for actuating said supporting structure and said discharge element simultaneously.

23. In a device of the character described the combination of an extensible boom structure including an outer casing and two telescoping inner members movable relatively to each other and to the outer casing, a motor supported from the outer casing and a friction drive controlled from the motor for displacing the inner members of the boom structure.

24. In a device of the character described the combination of a boom structure, comprising an outer member and two inner members movable relatively to each other and to the outer member, a motor fixed to the outer member, a frame structure supported from the outer member, friction gearing carried in said frame structure and means controlled by said friction gearing for displacing one of said inner boom members.

25. In a device of the character described the combination of a boom structure, having an outer member and a pair of telescoping inner members movable relatively to each other, a motor fixed to the outer member, a shaft extending transversely of the outer member, friction cones mounted on said shaft, transmission means under control of said friction cones to actuate the inner boom members selectively in either direction.

26. In a device of the character described the combination of a boom structure having an outer member and an inner member slidable therein, a motor secured to the outer member, a shaft extending transversely of the structure, friction cones mounted on said shaft, a friction disk rotatably disposed between said cones, and mechanism associated with the friction disk for causing relative displacement of the two members.

27. In a device of the character described the combination of a boom structure having two members slidable relatively to each other, a motor secured to one of the members, a countershaft extending transversely of the structure, friction cones mounted on said countershaft, a friction disk rotatably disposed between said cones, a mechanism associated with the friction disk for causing relative displacement of the two members, and means for yieldingly maintaining said friction cones normally in inoperative position.

28. In a device of the character described the combination of a boom structure having an inner and an outer member, a worm secured on the outer member, a rack on the inner member in engagement with said worm, means for driving said worm, a motor on the outer member, and means supported by the outer member for selectively altering the direction of rotation of said worm without altering the direction of rotation of the motor.

29. In a device of the character described the combination of a boom structure having inner and outer members, a motor secured to one of said members, a worm and rack drive, a transverse shaft driven by said motor, means supported from the outer member for selectively altering the direction of rotation of the drive and means for yieldingly holding the drive inoperative.

30. In a device of the character described the combination of a boom structure having inner and outer members, a motor supported by the outer member, a transverse shaft driven by said motor, friction cones on said outer shaft, a worm drive for the inner member, means for yieldingly maintaining said friction cones in inoperative position, and means for moving one of said cones to operative position and for simultaneously moving the other cone to a position more remote from operative position.

31. In a device of the character described the combination of a boom structure having an inner and outer member, a worm drive between said members, a frame supported by one of the members, a shaft extending transversely through the frame, a second shaft forming a part of the drive, and means on said first mentioned shaft for axially moving the second shaft to alter the direction of the drive.

32. In a device of the character described the combination of a boom structure having an inner and outer member, a motor secured to one of said members, means actuated by said motor for displacing one of the members relatively to the other member, a transverse shaft, means on the transverse shaft for rendering the drive operative and inoperative, said means including a sleeve mounted on said transverse shaft, an element associated with said sleeve for converting a rotary motion of the same into an axial movement, and means for imparting a turning movement to said sleeve.

33. In a device of the character described the combination of a boom structure having a casing, and two inner members, means for displacing one of the inner members, and flexible elements connected with one end of the other inner member and secured to the casing, said flexible elements being guided over opposite ends of the other inner member.

34. In a device of the character described the combination of a boom structure having an inner and outer member, a third member displaceable relatively to both of them, and flexible means secured to said third member and outer member respectively, for causing a differential movement of the third member with respect to said second member upon displacement of said second member with respect to said first member.

35. In a device of the character described the combination of a boom structure having a casing and two inner telescoping members, means for displacing the outer telescoping member with respect to the casing, and means secured to the casing and to the inner telescoping member for moving said inner telescoping member at the double rate of speed at which the outer telescoping member is moved with respect to the casing.

36. In a device of the character described the combination of a boom structure including a casing, a member longitudinally guided therein, a third boom member within the second member, means for displacing the second member relatively to the casing, ropes secured at one of their ends to the inner end of the third boom member and at their other end to the outer end of the casing, and sheaves carried by the second member at opposite ends, the ropes being guided over separate sheaves.

37. In a device of the character described the combination of a discharge element, a motor, cable drums, flexible elements connecting said discharge elements with said cable drums, and friction transmission means between said motor and said cable drums, and means for selectively driving either of said cable drums from said motor, said last named means being controlled by a single element.

38. In a device of the character described the combination of a boom structure, a discharge element, a motor for reciprocating the discharge element relatively of the boom structure, cable drums supported from the boom structure, flexible members secured to the discharge element, and to said cable drums respectively, friction disks associated with said cable drums, a pulley permanently driven by said motor, and means for selectively establishing operative relation between any of said friction disks and said permanently driven pulley.

39. In a device of the character described the combination of a boom structure, a discharge element, a motor, cable drums, supported by the boom structure, a pair of friction disks rotatably supported in the boom structure, a pulley permanently driven by the motor, and means for moving either of said friction disks into operative relation with respect to the permanently driven pulley.

40. In a device of the character described the combination of a boom structure, a motor, a discharge element, cable drums supported by the boom structure, flexible members fixed to the discharge element and cable drums, a pair of friction disks loosely rotatable on the boom structure, a pulley permanently driven by the motor, and means for alternately moving either of the friction disks into operative relation to said permanently driven pulley and for simultaneously removing the other friction disk from this operative relation.

41. In a device of the character described the combination of a boom structure, a motor, a discharge element, and transmission means between the motor and the discharge element, said motor and transmission means being supported from the boom structure, and means also supported from the boom structure for selectively interrupting and causing the movement of the discharge element.

42. In a device of the character described the combination of a boom structure, a sheet metal frame supported thereby, a motor on the boom structure, a reciprocating discharge element, a pulley permanently driven by the motor in one direction, a pair of cable drums in the frame, a pair of friction disks supported by the frame, a gearing between said friction disks and said cable drums within the frame, and means on the frame for establishing operative relation through said gearing between the friction disks and the motors.

43. In a device of the character described the combination of a boom structure, a reciprocating discharge element, a motor carried by the boom structure, a sheet metal frame on the boom structure, a pulley permanently driven by the motor in a pre-determined direction, a pair of friction disks adapted to be driven alternately by said pulley and operatively associated with the discharge element and means for normally maintaining said friction disks out of operative engagement with said pulley.

44. In a device of the character described the combination of a boom structure, a reciprocating discharge element, a frame carried by the boom structure, a pulley permanently driven by the motor in a predetermined direction, a pair of transverse shafts rotatably mounted in the frame, friction disks on said shafts and normally out of engagement with the pulley, and means supported in the frame and acting on said transverse shafts for selectively bringing either of said friction disks into engagement with said pulley.

45. In a device of the character described the combination of a boom structure, a frame supported thereby, a motor on the boom structure, a pulley permanently driven by the motor, a pair of transverse shafts having eccentric journal extensions resting in the frame, said shafts carrying friction disks normally out of engagement with said pulley, means controlled by said friction disks for actuating said discharge element, and means secured to the eccentric journals of the transverse shafts for selectively moving said friction disks into operative relation with respect to said pulley.

46. In a device of the character described the combination of a boom structure, a motor, a discharge element, a frame on the boom structure, cable drums supported by said frame, a pulley permanently driven by the motor, friction disks rotatably mounted on the frame and normally out of engagement with said pulley, a pinion rigidly connected with said friction disks, gears in engagement with said pinions and rigidly secured to the cable drums, and means on the frame for alternately bringing said friction disks into operative relation with respect to said pulley.

47. In a device of the character described the combination of a boom structure, a frame secured thereto, a reciprocating discharge element, means carried by the frame for actuating the discharge element, said means including a permanently driven pulley and friction disks adapted to be brought alternately into engagement with said friction pulley, and means for preventing both of said friction disks from simultaneously engaging said pulley.

48. In a device of the character described the combination of a boom structure, a frame supported thereby, a motor on the boom structure, a pulley permanently driven by the motor, a pair of transverse shafts having excentric journal extensions resting in the frame, crank arms connected with said journal extensions, friction disks mounted on said shafts, a rocking bar supported by the frame, links extending from the rocking bar to the journal extensions and means for imparting movement to the rocking bar.

49. In a device of the character described the combination of a boom structure, a frame supported thereby, a pulley mounted on the frame, a pair of shafts at opposite sides of the axis of the pulley, friction disks on the shafts, the shafts terminating in excentric journals, crank arms offset at right angles to each other on the excentrics, a rocking bar, links extending from the rocking bar to the crank arms and means for imparting movement to the rocking bar.

50. In a device of the character described, the combination of a turn table, a boom structure suspended from the turn table, a friction drive carried by the boom structure, a discharge element actuated by the friction drive, and means adjacent the turn table for controlling the friction drive to actuate or interrupt actuation of the discharge element.

51. In a device of the character described the combination of a boom structure, a turn table, from which the boom structure is suspended, a discharge element, motor mechanism for actuating the discharge element and a handle arm controlling the motor mechanism, said handle arm comprising two pivotally interconnected parts adapted to permit actuation of the arm elements from a fixed position independent of the angular position of the boom structure with respect to the turn table.

52. In a device of the character described the combination of a pair of friction disks, a permanently driven friction pulley, means for alternately bringing said friction disks into engagement with the friction pulley, a rocking bar controlling said means, and a handle connected with said rocking bar, a spring being interposed between said handle and bar for normally maintaining the two elements in alinement, permitting, however, an angular movement of the handle with respect to the rocking bar.

53. In a device of the character described the combination of a boom structure, a discharge element, a turn table, manually controlled mechanisms for extending and retracting the boom structure and for actuating the discharge element, and means associated with said mechanisms for permitting the actuation of the same, independently of the annular position of the turn table, said mechanisms being supported by the boom structure.

54. In a device of the character described the combination of a boom structure, a mechanism for extending and contracting the boom structure, supported from the same, and means for controlling said mechanism, said means including a handle bar and an element pivotally connected with the handle bar, said handle bar being rotatable in the plane of said element, to permit of manipulation of the bar from a fixed position independently of the angular position of the boom structure.

55. In a device of the character described the combination of a boom structure which can be contracted and extended, mechanism for contracting and extending it, manually actuated means for controlling said mechanism, said manual controlling means terminating in a handle bar, a link connecting said handle bar with the mechanism, means for pivotally supporting said bar from the link and means for restoring the bar after deflection about its pivot to its original position.

56. In a device of the character described the combination of a boom structure, a discharge element supported thereby, mechanism for reciprocating said discharge element, manually operable means for controlling said mechanism, a link bar in the mechanism, said means terminating in a handle bar pivotally associated with the link bar and means for restoring the handle bar to original position after deflection about the pivot.

In testimony whereof, I affix my signature in the presence of two witnesses at 445 Milwaukee Street, Milwaukee, Wisconsin.

GEORGE MANIERRE.

Witnesses:
  H. MITTELSTRASS,
  JULIA M. BURNS.